(12) United States Patent
Godager et al.

(10) Patent No.: US 9,534,454 B2
(45) Date of Patent: Jan. 3, 2017

(54) METHOD AND APPARATUS FOR STORING CABLE IN A WELLBORE

(71) Applicant: Sensor Developments AS, Sandefjord (NO)

(72) Inventors: Øivind Godager, Sandefjord (NO); Lee Adams, Houston, TX (US); Bruce H. Storm, Jr., Houston, TX (US)

(73) Assignee: Sensor Developments AS, Sandefjord (NO)

( * ) Notice: Subject to any disclaimer, the term of this patent is extended or adjusted under 35 U.S.C. 154(b) by 543 days.

(21) Appl. No.: 14/020,541

(22) Filed: Sep. 6, 2013

(65) Prior Publication Data

US 2014/0124217 A1    May 8, 2014

Related U.S. Application Data

(60) Provisional application No. 61/723,225, filed on Nov. 6, 2012.

(51) Int. Cl.
*E21B 17/02* (2006.01)
*E21B 41/00* (2006.01)

(52) U.S. Cl.
CPC ............ *E21B 17/026* (2013.01); *E21B 41/00* (2013.01)

(58) Field of Classification Search
CPC ................................................... E21B 17/026
See application file for complete search history.

(56) References Cited

U.S. PATENT DOCUMENTS

| | | | | |
|---|---|---|---|---|
| 5,722,488 A | * | 3/1998 | Normann | E21B 17/003 166/65.1 |
| 7,311,154 B2 | * | 12/2007 | Cho | E21B 17/026 166/241.1 |
| 9,187,963 B2 | * | 11/2015 | Richards | E21B 17/026 |
| 2004/0168794 A1 | * | 9/2004 | Vold | E21B 17/025 166/65.1 |

* cited by examiner

*Primary Examiner* — William P Neuder
(74) *Attorney, Agent, or Firm* — Haynes and Boone, LLP

(57) ABSTRACT

An apparatus for storing cable along a tubular in a wellbore using a first retainer for attachment to the tubular at a first location and a second retainer for attachment to the tubular at a second location. Each retainer is constructed and arranged to reverse the direction of the cable and to at least partially retain the cable due to elastic forces therein. In one embodiment, the cable is formed into a plurality of loops, each having an upper end retained by the first retainer and a lower end retained by the second retainer.

20 Claims, 8 Drawing Sheets

METHOD AND APPARATUS FOR STORING CABLE IN A WELLBORE

BACKGROUND OF THE INVENTION

Field of the Invention

Embodiments of the present invention generally relate to an apparatus and method for storing cable in a wellbore.

Description of the Related Art

The installation and operation of permanent control or sensor systems in oil or gas wells (geothermal, CO2 injection wells, etc.) requires the use of cables between the surface of the well and the downhole wellbore equipment for supply of power, control and/or the provision of a conduit for communications. For example, cable may include electrical conductors, hydraulic lines, or fiber optic cables. In most cases, the cable runs along a string of tubulars, like production tubing from downhole equipment to the surface of the well where it extends through a liner hanger or other device that supports the weight of the string. Generally, it is desired to run the cable parallel to the axis of the wellbore tubing with clamps applied to support the cable and hold it parallel to the tubing.

It is also common to provide extra cable at an upper end of the tubing string, just below the liner hanger or tubing hanger, to facilitate access to and service of downhole equipment. The additional cable, known as a "service loop", facilitates the replacement and rework of the downhole components as it provides personnel with extra cable. In one current technique, it is common to wrap numerous turns of the cable around the tubing in order to store it in the wellbore. In applications involving more than one cable, the cables are wound around the tubing side by side.

There are a number of difficulties associated with providing a service loop as described above. First, the cables are relatively stiff, so they resist being wound around the tubing and tend to "spring back" when released. In some instances, the cable (and any conductors therein) may break if bent beyond its elastic limit. This can require the involvement of multiple rig personnel when winding the cable. In a typical setting multiple individuals hold the excess cable while encircling the tubing numerous times in order to wrap the cable. The cable also has a minimum bending radius beyond which its mechanical integrity is compromised and great care must be taken not to bend the cable beyond this limit. Additionally, care must be taken to assure the cable is tightly wound around the tubing and does not overlap, as slack cable or overlaps increase the probability that the cable will be damaged during run-in. The process of unwrapping the cable is equally complex, as it must be unwound in a controlled manner to avoid entanglement or damage and to assure that any separate cable remaining on the tubing remains securely wound.

There is a need therefore, for an apparatus and method to store cable in a wellbore that overcomes the problems associated with prior art methods and apparatus.

SUMMARY OF THE INVENTION

The present invention generally teaches an apparatus for storing cable along a tubular in a wellbore using a first retainer for attachment to the tubular at a first location and a second retainer for attachment to the tubular at a second location. Each retainer is constructed and arranged to reverse the direction of the cable and to at least partially retain the cable due to elastic forces therein. In one embodiment, the cable is formed into a plurality of loops, each having an upper end retained by the first retainer and a lower end retained by the second retainer.

In another embodiment a method includes anchoring the cable at a first location on an outer wall of the tubular; extending a predetermined length of the cable along the outer wall in a direction substantially parallel to the axis of the tubular; anchoring the cable at a second location and; extending a second predetermined length in the direction of the first anchor location; whereby at each anchor location the cable is at least partially retained by elastic forces in the cable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
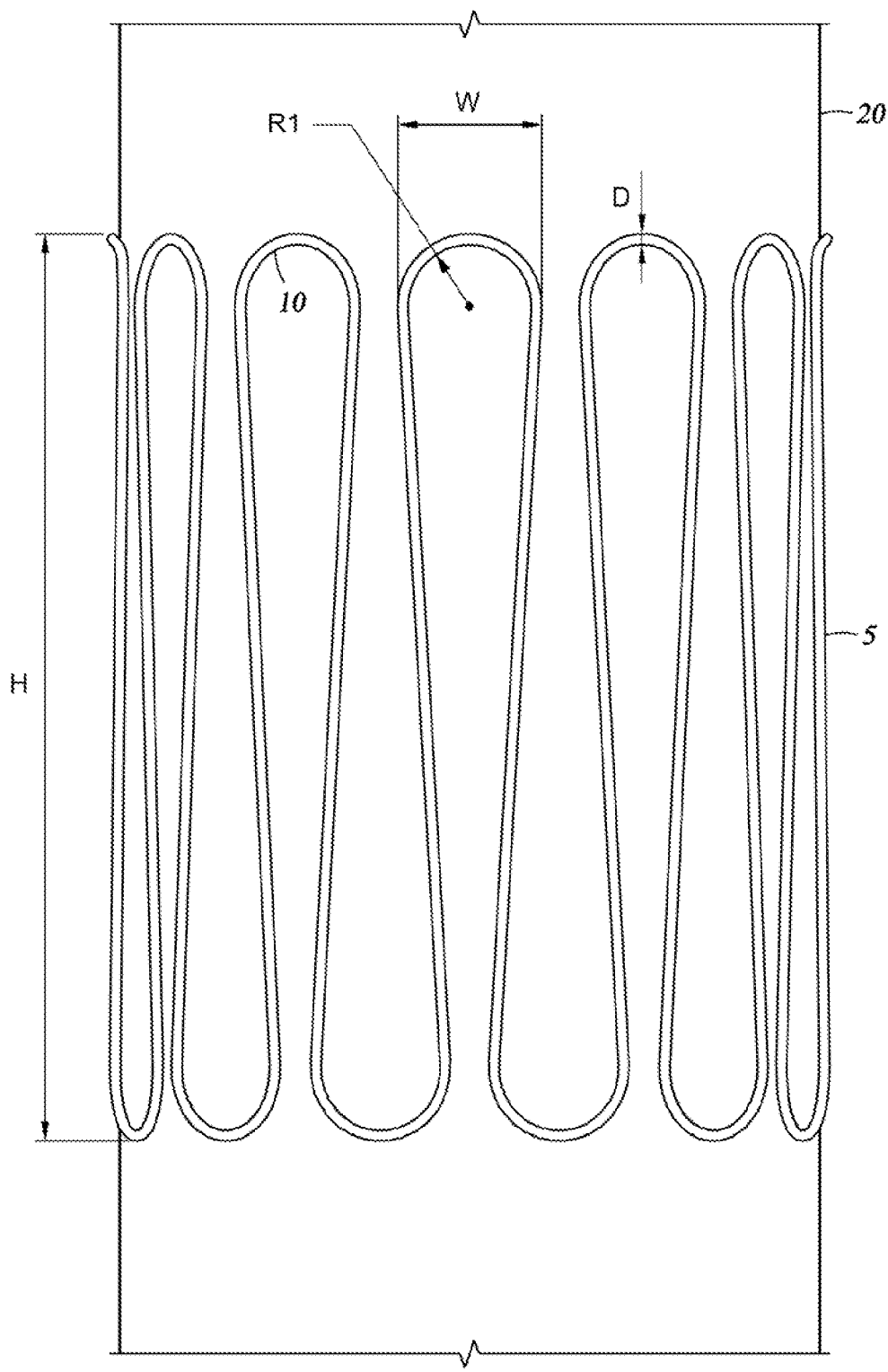
FIG. 1 is a side view showing a portion of a tubular having a length of cable stored thereon in a plurality of loops.

The present invention generally teaches a method and apparatus for storing cable in a wellbore. FIG. 1 is a side view showing a portion of a tubular having a length of cable stored thereon in a plurality of loops. In a typical application, a length of cable 5 is arranged at the upper end of a tubular string 20 and thereafter, the string is lowered and the length of cable 5 is retained in a plurality of non-intersecting loops 10 in the wellbore. While not shown in the figure, it will be understood that a first end of the length of cable extends towards the surface of the well, while an opposite end extends downward to a piece of equipment, like a pump.

The intent of the arrangement is to form the loops around the outer circumference of a tubular by offsetting the top of one loop from the bottom of the adjacent loops as depicted. The height "H" of the loops is determined based upon the amount of cable to be stored. The width "W" of the top and bottom portions of each loop are determined by the minimum bending radius "R" of the cable being stored. For the purposes of this disclosure, minimum bending radius is that radius into which a cable can be formed without damaging the cable. For example, a typical cable for powering a downhole component, like a pump, includes several copper conductors nested together and covered by a sheath. This arrangement necessarily results in a relatively stiff cable and one that has a limit to the shape it can assume without damaging the conductors. Likewise, the tubular used to carry and hold the pump at the bottom of the wellbore is necessarily of a diameter large enough to safely maintain the weight of the pump and convey pumped fluids to the surface of the well. The size and bending characteristics of the cable, as well as the circumference of the tubular, therefore determines the number of loops that can be formed therearound. For example, radius R illustrates a minimum bending radius for the cable 5 of FIG. 1. In one example, a typical tubular used to maintain an electric pump downhole has a circumference of 30 inches and a cable used to provide electrical power to the pump has a diameter of 1 inch and a minimum bending radius of 6 inches. Permitting a nominal amount of space between the loops, six loops can effectively be formed around the circumference of the tubular.

Figure 2:
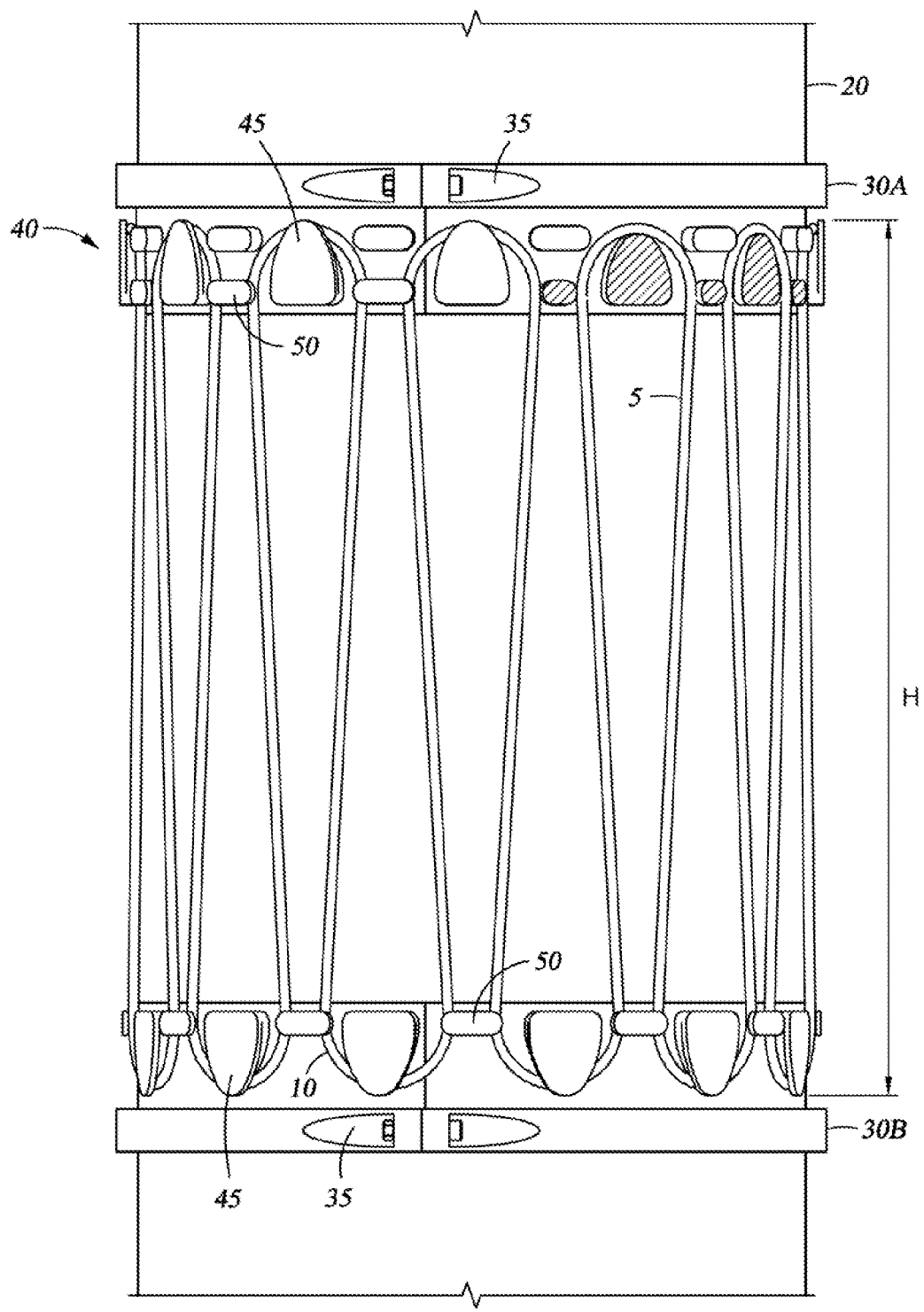
FIG. 2 is a side view of the tubular illustrating an upper and lower retainer for retaining loops of the cable at an upper and lower end.

FIG. 2 is a side view of the tubular 20 and length of cable 5 and illustrates an upper and lower retainers for retaining loops 10 of the cable at an upper and lower ends. The retainers 30A, 30B can be installed at any location on the tubular, and their placement and separation determines the height "H" of loops of the cable 5. In one embodiment, each retainer includes a fastener 35 that is cammed and permits the retainer to be tightened around the tubular. While the retainers in the embodiment shown are clamp-like, it will be understood that the retainers could operate any number of ways and be secured around the tubular with threads, welds, or any other pressure-inducing means. Further, the retainer may be constructed of any mechanically suitable material which retains its properties in a wellbore environment (e.g. steel, aluminum, other metal, or composites like injection molded resins, "plastics" etc.)

Visible in FIG. 2 on each retainer are a plurality of formations 40 constructed and arranged to hold the top and bottom of each loop in a manner that avoids damage to the cable but utilizes the natural elasticity of the cable to aid in its retention in the retainer. In the embodiment shown, a main formation 45 is centered under each loop 10 at the top retainer 30A and above each loop at the bottom clamp 30B. The retainers are installed whereby each main formation 45 of the bottom retainer is rotationally distinct from its mating formation 45 on the upper retainer, thus encouraging the loops of cable to extend around the tubular. For example, in the embodiment of FIG. 2, the retainers are installed whereby the upper and lower main formations 45 are equally staggered around the circumference of the tubular 20.

While the main formations 45 support the loops of cable at an upper and lower ends, side formations 50 operate to restrain the sides of each loop at an upper and lower end by acting against the elasticity of the loop 10. In the embodiment shown, a single side formation 50 on each retainer 30A, 30B is utilized by two adjacent loops 10. Additional side formations 50 are provided to facilitate the installation of the cable 5 and to retain the loops in the event the loops should slacken and their elasticity should urge them away from the main formation 45.

Figure 3:
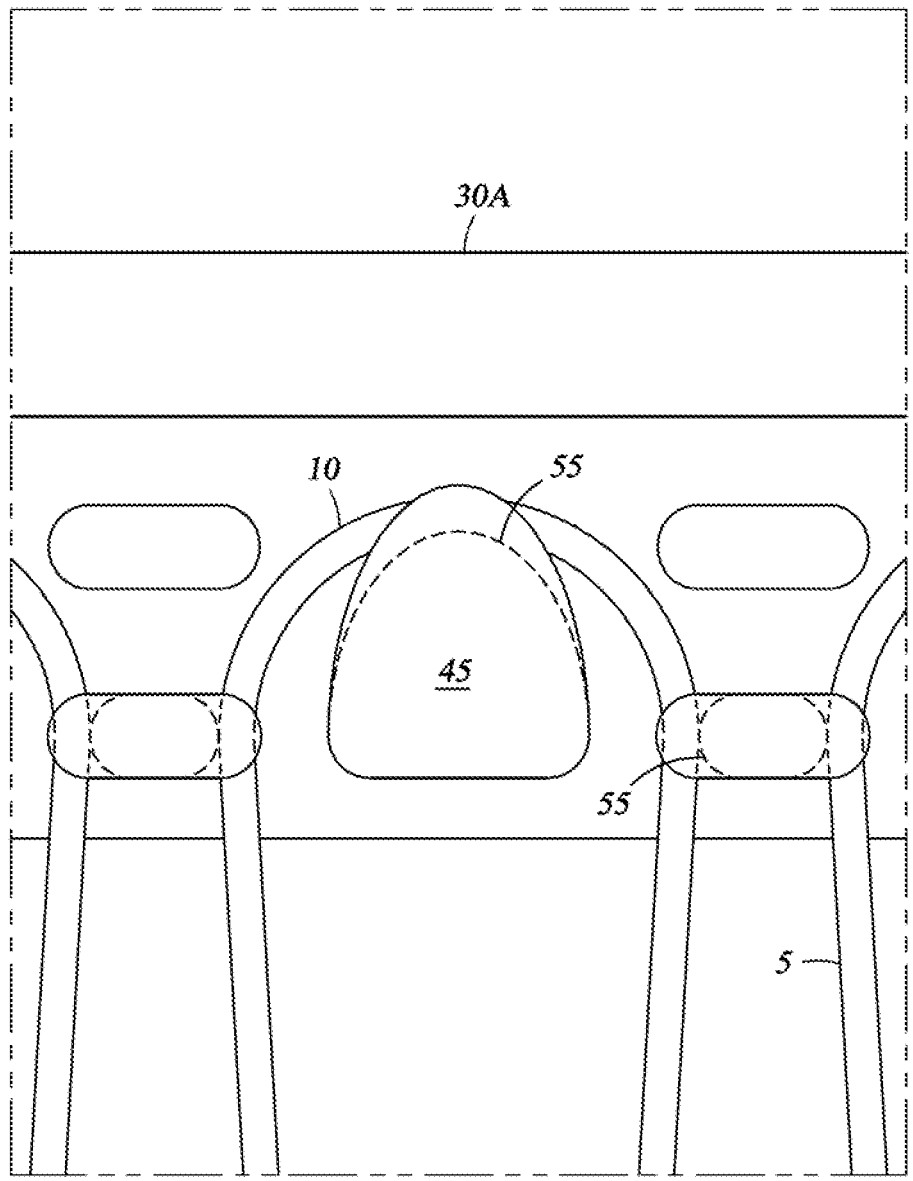
FIG. 3 is an enlarged view of the upper retainer illustrating formations formed thereon for retaining an upper portion of loops of cable.

FIG. 3 is an enlarged view of the upper retainer 30A illustrating main 45 and side 50 formations thereon for retaining an upper portion of the loops 10 of cable 5. The upper portions of three loops 10 are shown. The figure illustrates the design of the formations, particularly an undercut 55 provided in each formation 45, 50 to further retain the loops and prevent the cable 5 from extending outwards away from a surface of the tubular 20. For example, the main formation 45 shown in this figure not only supports the loop 10 from below, but also retains the loop against a wall of the tubular 20. Similarly, the side formations not only prevent the sides of the loop from extending outwards (due to their elasticity), but also retains them against the tubular wall.

Figure 4:
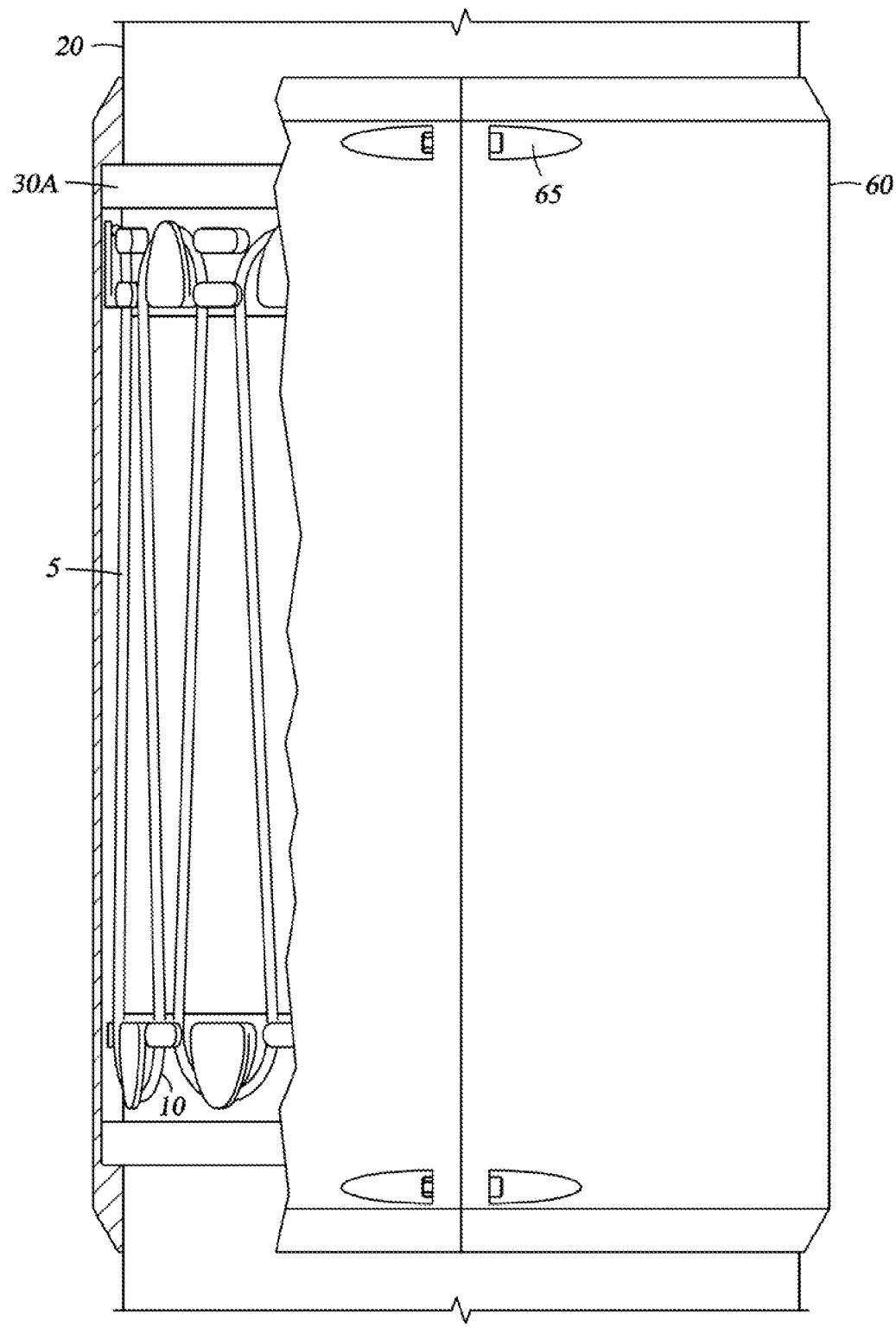
FIG. 4 is a partial section view of the tubular showing a cover for covering the loops of cable.

FIG. 4 is a partial section view of the tubular 20 showing a cover 60 covering the loops 10 of cable 5. The cover in the embodiment shown includes a hinge portion on one side (not shown) and a clamping arrangement 65 on an opposite side with a fastener. The cover 60 is constructed and arranged to extend around the tubular 20 in the area of the loops 10 to isolate the loops and retainers 30A, 30B from the wellbore therearound, thereby reducing the likelihood of damage to the cable 5 and associated hardware. The cover 60 is optional and it may be constructed and arranged to encompasses the upper and lower retainers as shown in the Figure, or may be "split" such that it only covers a section of cable fixed in the retainer. In other embodiments, the cover may be incorporated into the design of the retainer or may be a separate component.

Figure 5:
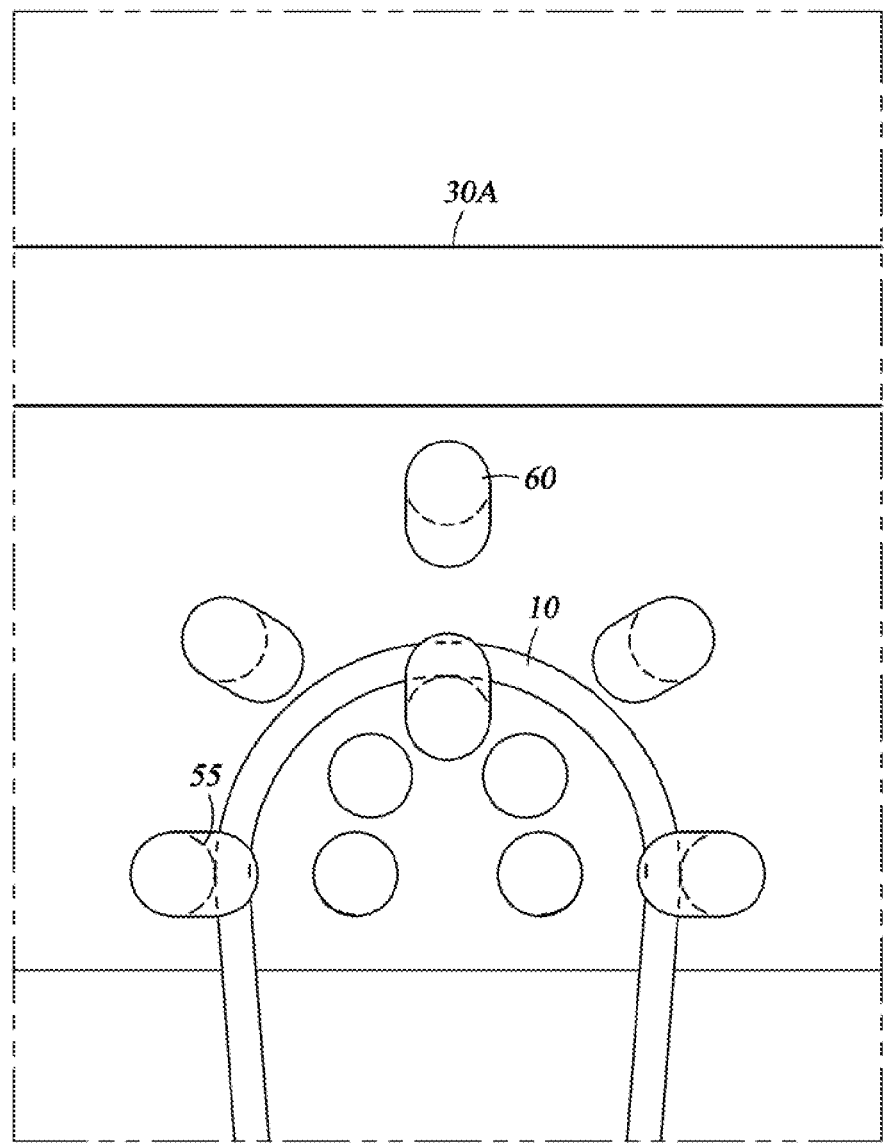
FIG. 5 is an enlarged view of an upper portion of a retainer having pegs for retaining the loop.

FIG. 5 is an enlarged view of an upper portion of a loop 10 and various peg formations 60 for retaining the loop. FIG. 5 is an alternative arrangement wherein the retainers are provided with the pegs 60 that work together to maintain an upper end of a loop 10 of cable 5 in its curved shape against its natural elastic tendency to straighten. The pegs 60 are arranged in two semicircles with a curved area therebetween to maintain an upper end of the loop. In the embodiment of FIG. 5, certain pegs are provided with an undercut 55 to support and retain the cable against a wall of the tubular 20.

Figure 6:
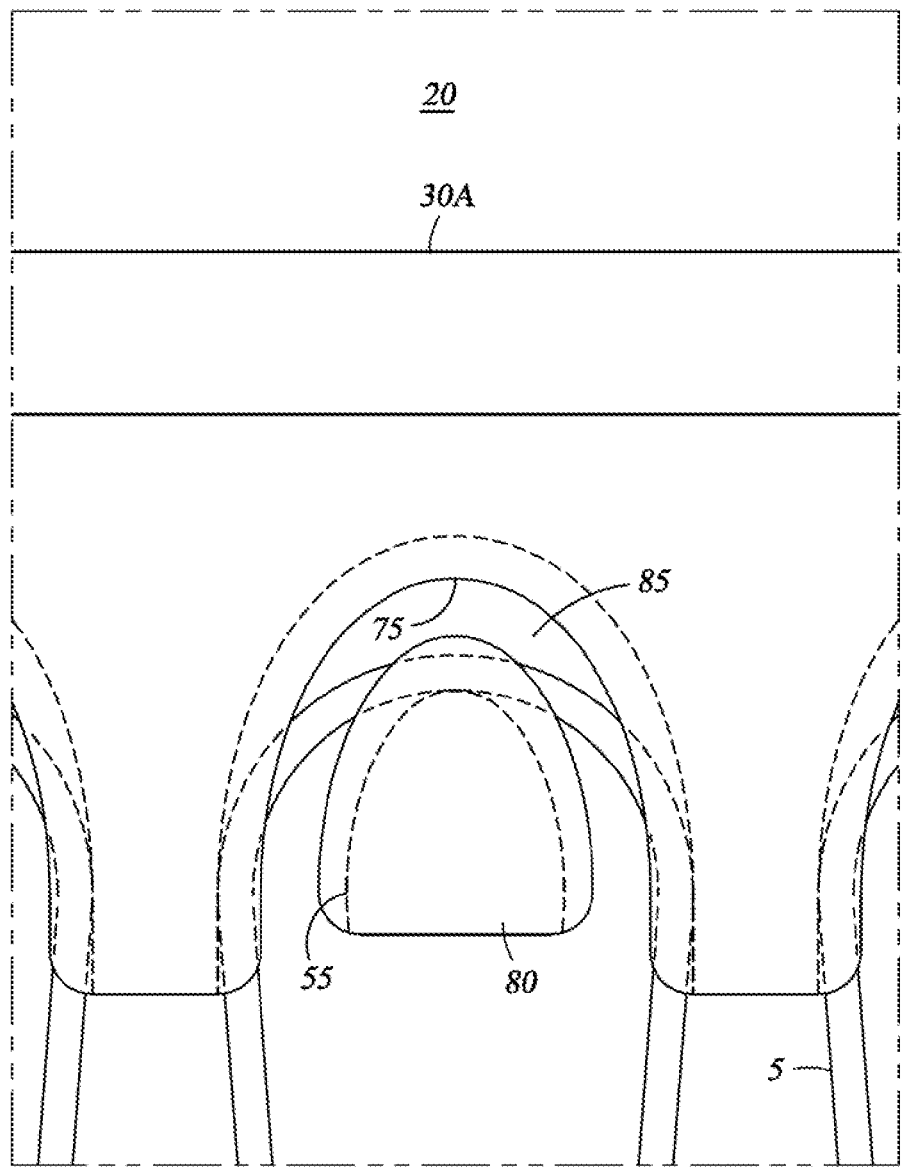
FIG. 6 is another embodiment showing an upper portion of a retainer and formations for retaining a loop.

FIG. 6 is another embodiment showing a portion of an upper retainer 30A having a main formation 75 and a corresponding formation 80 whereby a curved groove 85 is formed therebetween. As shown, an upper end of a loop 10 of cable 5 is supported in the curved groove 85. Like the other embodiments, portions of each formation 75, 80 are undercut 55 to further retain the cable against movement away from the tubular wall. It will be understood that FIGS. 3, 5 and 6 show the various arrangements at an upper end of a loop and that corresponding arrangements would typically be provided at a lower end of each loop retainer.

In a typical operation, a length of cable 5 is stored on a tubular 20 in the following manner. First, a selected section of tubular is exposed at the surface of the well, typically by retaining it temporarily with draw works or some temporary hanging mechanism. Thereafter, an upper and lower retainer 30A, 30B are installed with the distance therebetween determined by the amount of cable to be stored. In a typical case, the retainers are rotationally arranged so that the formations on each have an alternating relationship between top and bottom. The retainers are chosen based upon the circumference of the tubular, and the formations thereupon to retain the upper and lower ends of the loops 10 are chosen based upon the size and bending characteristics of the cable 5. The loops are then formed one at a time by extending the cable around formations of the top retainer and around the formations of the lower retainer. The tubular can be rotated or an installer can move around the tubular as the loops are formed.

Figure 7:
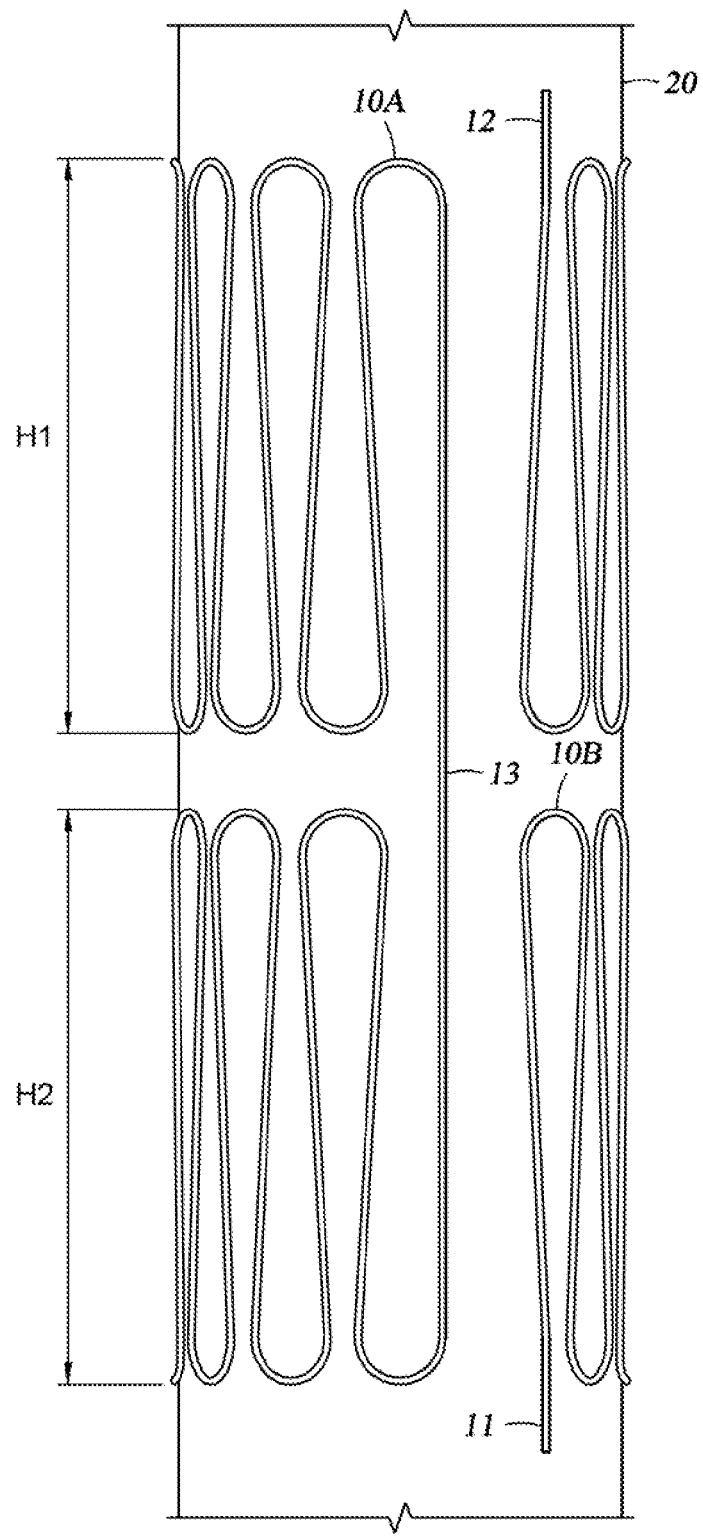
FIG. 7 illustrates an upper and lower plurality of loops disposed on a single tubular.

FIG. 7 illustrates an upper and lower plurality of loops 10A, 10B disposed on a tubular 20. The purpose of FIG. 7 is to illustrate that additional cable 5 can be stored on a single tubular by arranging the cable in two separate groups of loops 10A, 10B, one upper group and one lower group. In the embodiment, each group includes its own upper and lower retainers (not shown) with one end of the cable 11 at the lower group extending to downhole equipment and cable at the upper end 12 extending to the surface of the well.

Another length of cable 13 extends between the upper group 10A and lower group 10B. In the embodiment of FIG. 7, the length of cable stored is doubled, making the arrangement especially useful in cases where the tubular has a relatively small diameter or in cases where additional cable needs to be stored. In this embodiment, the tubular would be typically held at a first position while the upper loops 10A are arranged and thereafter, at a second position while the lower loops are arranged. While the upper 10A and lower 10B loops are shown as being equal in height "H1", "H2", they need not be.

Figure 8:
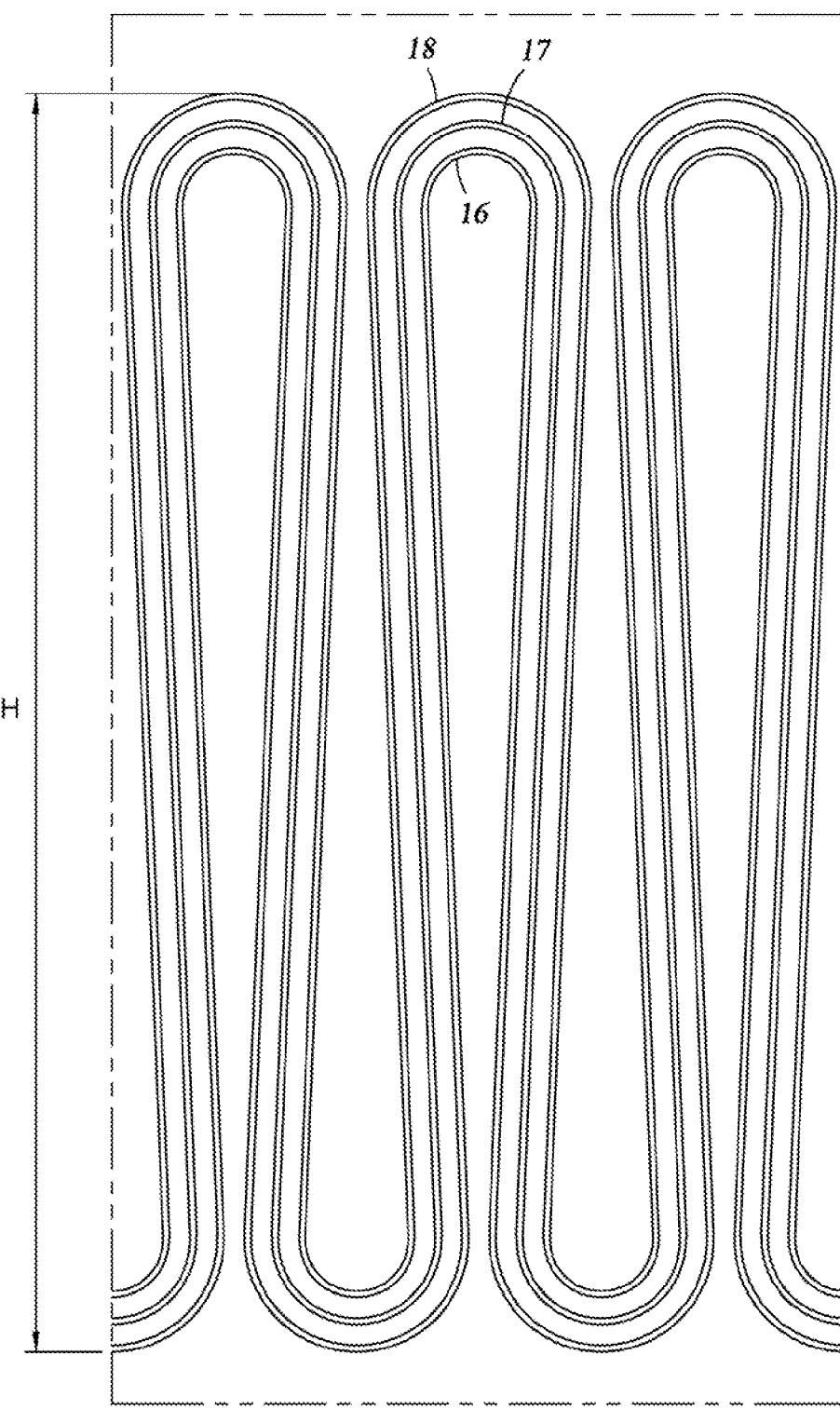
FIG. 8 illustrates a plurality of nested loops retained on a single length of tubular.

FIG. 8 illustrates a plurality of nested loops 16, 17, 18 retained on a single length of tubular. FIG. 8, like FIG. 7, illustrates an arrangement whereby a number of loops of the same height "H" is multiplied by nesting the loops together. In this arrangement, however, upper and lower retainers (not shown) are equipped with multiple sets of the formations or pegs like those shown in FIGS. 2-3, 5-6, permitting the upper and lower ends of multiple loops to be stored in a manner that prevents the loops from intersecting with each other.

While the foregoing is directed to embodiments of the present invention, other and further embodiments of the invention may be devised without departing from the basic scope thereof, and the scope thereof is determined by the claims that follow.

The invention claimed is:

1. An apparatus for storing cable along a tubular in a wellbore, comprising:
    a first retainer for attachment to the tubular at a first location;
    a first plurality of main formations and side formations disposed on the first retainer;
    a second retainer for attachment to the tubular at a second location; each retainer constructed and arranged to reverse the direction of the cable and to at least partially retain the cable due to elastic forces therein; and
    a second plurality of main formations and side formations disposed on the second retainer;
    wherein the first and second retainers are each locatable at a different predetermined axial location along a wall of the tubular;
    wherein the retainers are installed in a manner whereby each main formation of the plurality of main formations on the first retainer are rotationally distinct from each main formation of the plurality of main formations on the second retainer.

2. The apparatus of claim 1, wherein the cable is formed into a plurality of loops, each having an upper end retained by the first retainer and a lower end retained by the second retainer.

3. The apparatus of claim 1, wherein a first end of the cable terminates at a first end of a tubular string and a second end of the cable terminates at a second end of the tubular string.

4. The apparatus of claim 3, wherein the cable is an electric cable.

5. The apparatus of claim 3, wherein the cable is a hydraulic cable.

6. The apparatus of claim 3, wherein the cable is a fiber optic cable.

7. The apparatus of claim 2, wherein each retainer supports each loop at an end of the loop and both sides of the loop.

8. The apparatus of claim 7, wherein support at an end of the loop is provided by an outwardly extending main formation.

9. The apparatus of claim 8, wherein support at both sides of the loop is provided by side formations, the formations retaining the cable against the elastic forces.

10. The apparatus of claim 2, wherein each loop in the plurality of loops has a height H determined by the distance between the retainers.

11. The apparatus of claim 10, further including a removable cover isolating the upper and lower retainers and the loops from an environment therearound.

12. The apparatus for claim 2, further including a second cable formed into a second plurality of loops and retained by the first and second retainer.

13. The apparatus of claim 1, further including an intermediate retainer disposed on the tubular between the first and second retainers, the intermediate retainer permitting the cable to be formed into a first plurality of loops to be retained between the first and intermediate retainer and a second plurality of loops to be retained between the second and the intermediate retainer.

14. A method of storing cable along a tubular in a wellbore, comprising:
    securing first and second retainer around an outer wall of the tubular, each retainer having a plurality of main formations disposed thereon;
    anchoring the cable at a first location on a main formation on one of the first and second retainers;
    extending a predetermined length of the cable along the outer wall in a direction substantially parallel to the axis of the tubular;
    anchoring the cable at a second location on a main formation on the other of the first and second retainers;
    extending a second predetermined length in the direction of the first anchor location;
    whereby at each anchor location the cable is at least partially retained by elastic forces in the cable.

15. The method of claim 14, further comprising anchoring the cable at a third and a fourth location.

16. An apparatus for storing cable along a tubular in a wellbore, the apparatus comprising:
    a first retainer disposed on the tubular at a first location and having a first plurality of main formations and side formations; and
    a second retainer disposed on the tubular at a second location and having a second plurality of main formations and side formations;
    wherein the first plurality of main formations on the first retainer are circumferentially staggered from the second plurality of main formations on the second retainer.

17. The apparatus of claim 16, wherein the cable is formed into a plurality of loops, each having an upper end retained by the first retainer and a lower end retained by the second retainer.

18. The apparatus of claim 17, wherein each side formation of the first and second plurality of main formations and side formations is in engagement with two adjacent loops of the cable.

19. The apparatus of claim 18, wherein each main formation and each side formation of the first and second plurality of main formations and side formations includes an undercut, the undercuts being in engagement with the cable.

20. The apparatus of claim 16, wherein the first retainer and the second retainer each includes a fastener to tighten the first and second retainer around the tubular.

* * * * *